(12) United States Patent
Alder et al.

(10) Patent No.: US 7,350,950 B2
(45) Date of Patent: Apr. 1, 2008

(54) SAFETY DEVICE (75) Inventors: Randall F. Alder, Fenton, MI (US);
Myles E. Davis, Milford, MI (US);
Donald B. Ford, Auburn Hills, MI (US); William P. Long, White Lake, MI (US)

(73) Assignee: Safe-T-Lite LLC, Milford, MI (US)

( * ) Notice: Subject to any disclaimer, the term of this patent is extended or adjusted under 35 U.S.C. 154(b) by 127 days.

(21) Appl. No.: 11/198,958

(22) Filed: Aug. 8, 2005

(65) Prior Publication Data
US 2007/0030689 A1    Feb. 8, 2007

(51) Int. Cl.
*B60Q 1/26* (2006.01)
*B60Q 1/00* (2006.01)
*B60Q 3/00* (2006.01)

(52) U.S. Cl. ............... 362/540; 362/486; 362/503; 340/473; 116/30; 40/556; 446/202; 446/487; 446/488

(58) Field of Classification Search ......... 362/486, 362/503, 540, 186; 340/473; 116/30, 42, 116/35; 40/556, 591; 446/202, 487, 488
See application file for complete search history.

(56) References Cited

U.S. PATENT DOCUMENTS

| 3,334,554 | A | | 8/1967 | Adams |
| 3,895,348 | A | * | 7/1975 | Palermo ............... 340/472 |
| 4,552,089 | A | | 11/1985 | Mahoney |
| 4,858,551 | A | | 8/1989 | Peters |
| 4,941,473 | A | * | 7/1990 | Tenerz et al. ............ 600/486 |
| 5,351,431 | A | * | 10/1994 | Ryu ....................... 43/17 |
| 5,775,834 | A | | 7/1998 | Jackson |
| 5,786,758 | A | * | 7/1998 | Bullock ............... 340/539.32 |
| 5,933,081 | A | * | 8/1999 | Jones ................. 340/539.32 |
| 6,065,423 | A | * | 5/2000 | Hensel ................. 116/35 R |
| 6,129,035 | A | * | 10/2000 | Schweinberger ....... 116/28 R |
| 6,580,368 | B1 | * | 6/2003 | Jacobs ................ 340/539.11 |
| 6,658,273 | B1 | * | 12/2003 | Sharp ................... 455/575.1 |

FOREIGN PATENT DOCUMENTS

GB            2239815        *    7/1991

* cited by examiner

*Primary Examiner*—Jacob Y. Choi (57) ABSTRACT

A safety device comprising a housing, an extendable tube located in the housing, and a light source for illuminating the extendable tube. The extendable tube is translucent and may be extended from a first position to a second position.

18 Claims, 7 Drawing Sheets

SAFETY DEVICE

TECHNICAL FIELD

The present invention generally relates to safety devices and in particular, to a portable emergency light beacon.

BACKGROUND OF THE INVENTION

There are a myriad of visual devices used for safety or emergency purposes. Such devices are typically only marginally effective and in many situations may be dangerous in their use. For instance, flares are a conventional means for signaling an emergency or the need for help, however, flares have limited use. Once the flare has been ignited and used up, it can not be reused. The flares, themselves, offer only temporary visibility and using a flares can be potentially dangerous. Flashlights are not potentially dangerous like flares; however, flashlights also have drawbacks. Light from a flashlight can only be seen from a limited distance because the light is not concentrated through any reflector. A standard antenna or coiled rod has limited extendibility due unacceptably large package size when retracted.

SUMMARY OF THE INVENTION

The inventors of the present invention have recognized these and other problems associated with the safety devices. To this end, the inventors have invented a safety device comprising a housing with an extendable tube and a light source. The extendable tube is translucent and may be extended from a first position within the housing to a second position external of the housing. While in the first position of within the housing, the extendable split tube is a thin flat piece of material that is wound into a compact coil. When extended to the second position, outside the housing, this coil reverts to a tubular shape, providing a great strength to length ratio by the nature of physics of a thin walled split tubes. This is an improvement over an antenna or coiled rod, because the inventors are taking advantage of the fact that, if you split a split tube axially along its length and lay it flat across its cross-section, it can be coiled into a small package for storage into a small housing.

DETAILED DESCRIPTION

Referring to the Figures, a safety device is generally shown at 10. The safety device 10 comprises a housing 12, an extendable tube 14 and a light source 16. As illustrated, the housing 12 has a generally elliptical shape formed by a continuously curved surface 17 and two substantially flat opposing sidewalls 19. The continuously curved surface 17 has an inner surface 17a, an outer surface 17b and includes two indents 18. The indents 18 bring opposing sides of the continuously curved surface 17 towards each other, thereby providing a comfortable grip for human hands to grasp the housing 12. The indents 18 separate housing 12 into a top portion 11 and a bottom portion 13.

It can be appreciated that housing 12 is not limited to the shape illustrated and may be of any shape. In an embodiment of the invention, the housing 12 is made from a hard plastic. However, housing 12 may be manufactured from any material and by any manufacturing process. In an alternate embodiment of the invention, the housing 12 may be partially, or substantially, covered with a reflective surface (not shown) or a reflective coating (not shown), while the housing 12 is made from a plastic. In a further alternate embodiment of the invention, housing 12 may be a metal, such as, for example, stainless steel.

The housing 12 further includes an aperture 20. As illustrated, the aperture 20 is located on the continuously curved surface 17 along the top portion 11 of housing 12. However, it can be appreciated that the aperture 20 may be positioned anywhere along the continuously curved surface 17 of housing 12. Aperture 20 is discussed in greater detail below.

Safety device 10 may further include a cap 21. As shown, cap 21 corresponds in shape to the continuously curved surface 17 of the housing 12. Accordingly, cap 21 may be placed over the top portion 11 of the housing 12 to cover up aperture 20 when the safety device 10 is not in use, or cap 21 may be placed over the bottom portion 13 of housing 21, for storage purposes, when the safety device 10 is in use. In an embodiment of the invention, cap 21 is manufactured from the same material as housing 12 and may be secured to housing 12 by a snap fit, a friction fit, or the like.

In an alternate embodiment, cap 21 may be a flap integrated into housing 12 via a hinge, a link, or the like. The flap may cover aperture 20 when the safety device 10 is not in use, and may flip up to expose aperture 20 when the safety device 10 is in use. In a further alternate embodiment, aperture 20 may include a flexible cap that may be secured to housing 12 by adhesives, snaps, or the like. However, the invention can be practiced without cap 21.

The safety device 10 may further include an axis of rotation 22 within housing 12. The axis of rotation 22 may be, for example, a rod, a dowel, a shaft, or the like. Rod 22 intersects bottom portion 13 of housing 12. Accordingly, rod 22 is rotatably secured to opposing sidewalls 19 of housing 12 at rotation points 24. It can be appreciated that rod 22 may be located anywhere within housing 12, so long as aperture 20 and rod 22 are located within opposing portions 11, 13 of housing 12. It can be appreciated that the dimensions of rod 22 is dependent upon the dimensions of housing 12.

One end 14a of extendable tube 14 may be secured to rod 22 by any conventional means, for example, by tape, glue, epoxy, rivet, threaded fastener, or the like. Extendable tube 14 is has a split along an axial seam 14c/d. As the tube 14 is being retracted into the housing 12, its shape is being transformed within or at the base of the housing (near the aperture 20). Within this transformation or transition area, this split seam 14c/d is separated, and spread apart to the point of flattening 14 into a flat strip of material. This flat strip of material can then be wound about itself into a coil around a rod 22 with the inner most portion of coil being 14a, and the opposing, or free, end 14b of extendable tube 14 remaining unrestricted. Separating, spreading, and flattening of the split tube 14 most likely happens gradually at the housing 12 as it is pulled into the housing, however it may be appreciated that an alternate means of separating, spreading, and flattening of the split tube may be used. As a result, rod 22 forms an axis of rotation which allows extendable tube 14 to be extended or retracted. Alternatively, there may not be a physical entity for axis of rotation 22. In such an embodiment, extendable tube 14 may rotate without any physical rod, shaft, dowel or the like.

Figure 9:
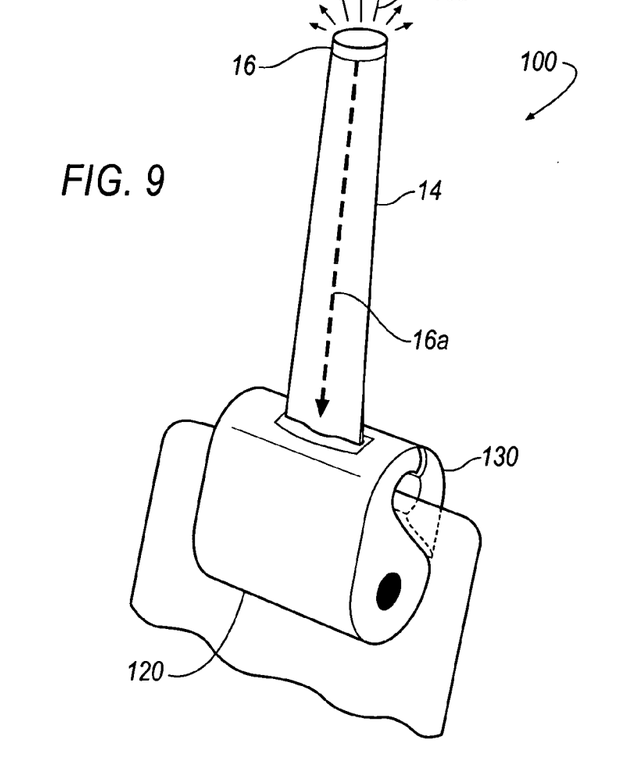
FIG. 9 is a perspective view of the safety device according to another embodiment of the invention.

Light source 16 of safety device 10 may be secured to the housing 12 in close proximity of aperture 20. The light source 16 may be secured to housing 12 by conventional means, including, for example, glue, tape, or the like. Alternatively, housing 12 may contain a compartment, a receptacle, a pocket, or the like, for holding the light source 16. In a further alternative embodiment, light source 16 may be secured to free end 14b of extendable tube 14, as illustrated in FIG. 9. Light source 16 may be a light emitting diode (LED), or a conventional light bulb, or the like, and may be powered through either a battery source (not shown), or an external electrical source. The intensity of the illumination may be dependent upon the type of LED or bulb being used.

Extendable tube 14 may be extended past housing 12 by passing through aperture 20. The extendable tube 14 may change from having a substantially flat cross-section to having a predetermined, hollow tubular cross-section. As illustrated, the predetermined hollow tubular cross-section may be circular in nature. However, it can be appreciated that extendable tube 14 may change to any hollow tubular shape or cross-sectional configuration, such as, for example, a triangular cross-section, an elliptical cross-section, a trapezoidal cross-section, or the like. It can be appreciated that extendable tube 14 may change in cross-sectional shape either within housing 12, or external of housing 12. As illustrated, portions of opposing edges 14c, 14d of extendable tube 14 may abut, or overlap, one another to form the substantially hollow tubular cross-section shape of extendable tube 14.

The rate of change in shape of the extendable tube 14 may be dependent upon the material used to manufacture the extendable tube 14. As a result, a more flexible material would provide a greater rate of change in shape than a more rigid material. It can be appreciated that extendable tube 14 may be made from either a transparent plastic material, cross-linked or thermal-set polymer, a metal material, or a combination of materials. For example, extendable tube 14 may have a plastic exterior and a partial metal interior.

While an embodiment of the invention illustrates aperture 20 as having a shape that correlates to the extendable tube 14 when the extendable tube 14 has a substantially tubular cross-section, it can be appreciated that aperture 20 may be shaped so as to correlate to the shape of extendable tube 14 when extendable tube 14 has a substantially flat cross-section. In such an embodiment, it can be appreciated that extendable tube 14 may be able to change shape from being substantially flat cross-section to being substantially tubular cross-section entirely within or outside of housing 12. Regardless of approach, when fully extended for rigidity, the extendable tube 14 outside of housing 12 will be completely tubular in its cross-section. Additionally, safety device 10 may further include a seal (not shown) between extendable tube 14 and aperture 20. Consequentially, housing 12 may be sealed so that contaminants may not enter extendable tube 14 or housing 12 when the extendable tube 14 is extended.

When extended, the opposing edges 14c, 14d of extendable tube 14 may be secured together by various securing means 30 (shown in phantom), including, for example, re-sealable adhesives, snaps, zipper, magnets, or the like. It is also understood that extendable tube 14 may comprise of a material having substantial shape memory characteristics or may be reconfigurably deformable, such as, for example, spring steel. In such a situation, opposing edges 14c and 14d may maintain the desired cross-sectional configuration without securing means 30.

While the illustrated embodiment depicts one location for the securing means 30, it can be appreciated that any number of securing means 30, at any location, may be utilized to secure together opposing edges 14a, 14b of extendable tube 14. For instance, the longer the extendable tube 14, the more securing means 30 may be required. Also, the strength of the securing means 30 may dictate how many are required to properly secure together opposing edges 14c, 14d.

Figures 1, 2:
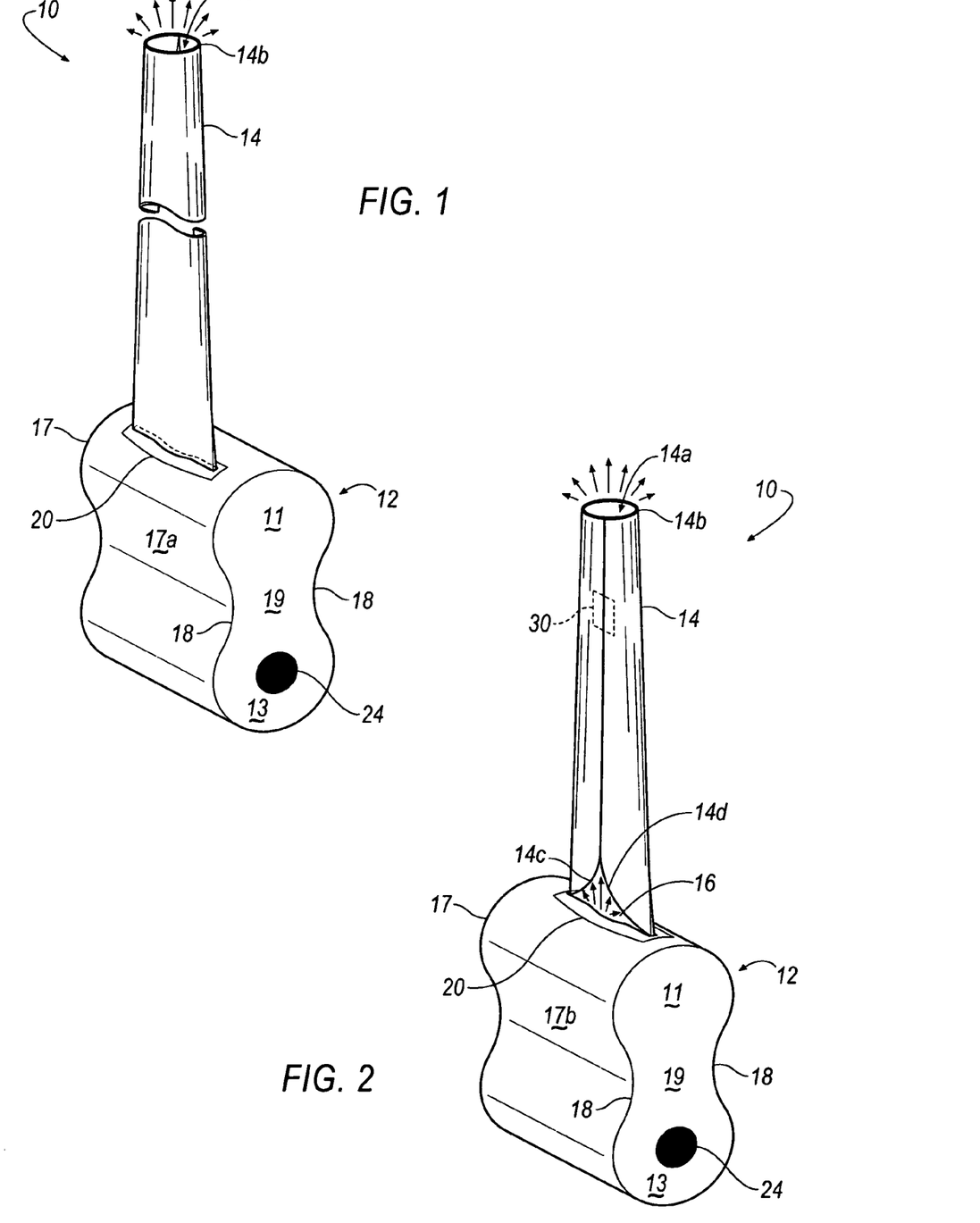
FIG. 1 is a perspective view of a safety device with an extendable tube partially extended according to an embodiment of the invention.
FIG. 2 is a perspective view of the underside of safety device with the extendable tube partially extended according to an embodiment of the invention.
Figures 3, 4:
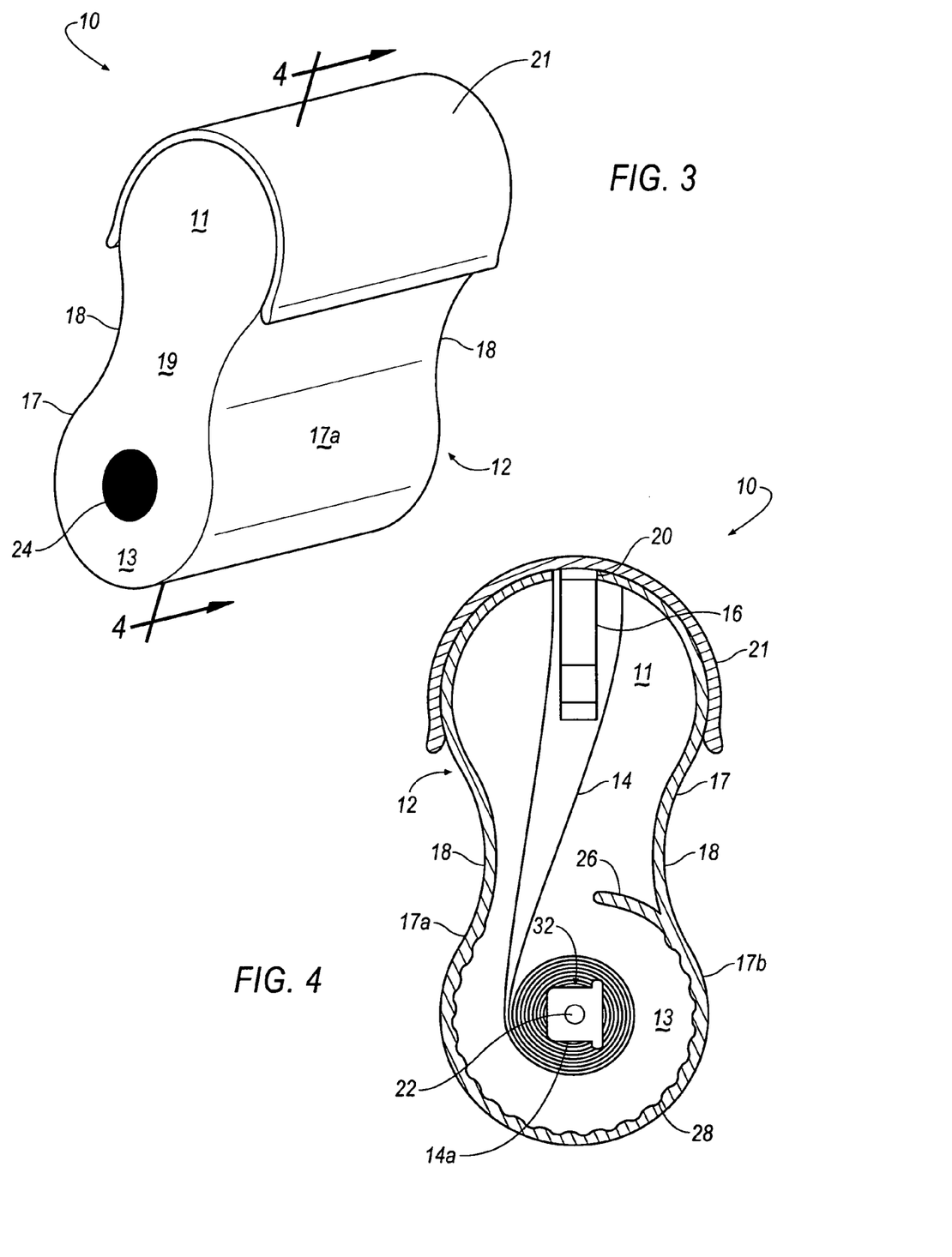
FIG. 3 is a perspective view of the safety device with a dust cover according to a further alternate embodiment of the invention.
FIG. 4 is a cross-sectional view of the safety device taken along line 4-4 of FIG. 3 according to an embodiment of the invention.
Figure 5:
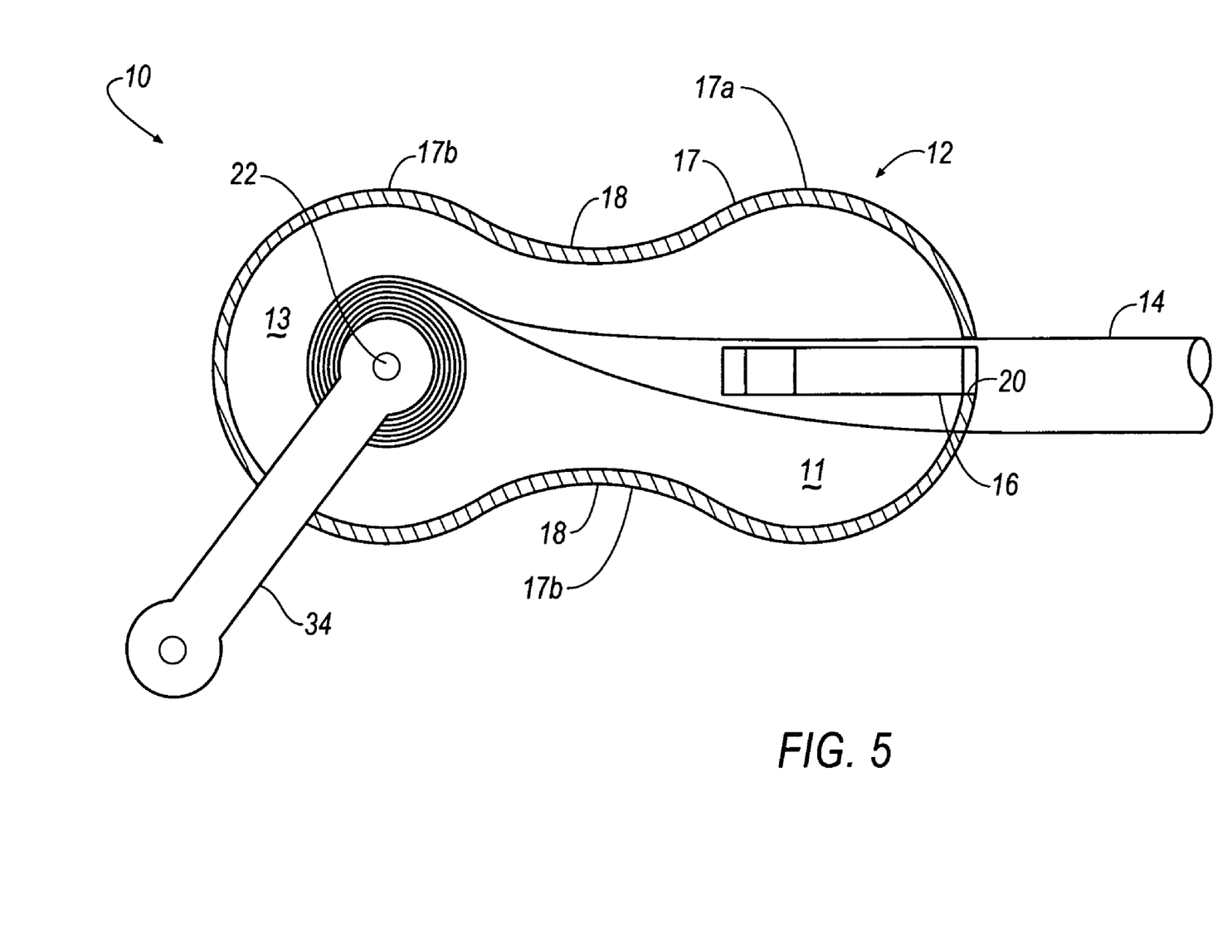
FIG. 5 is a cross-sectional view of the safety device including a means for extending and retracting the extendable tube according to an alternate embodiment of the invention.

Safety device 10 further includes means for extending and retracting 32 extendable tube 14. As illustrated in FIG. 4, means for extending and retracting 32 extendable tube 14 is an electric operating motor that operates using the same power source as light source 16. The means for extending and retracting 32 extendable tube 14 may be any number of devices, including, for example, a hand crank 34 as depicted in FIG. 5. In a further embodiment, extendable tube 14 may be extended and retracted by simply pulling or pushing on free end 14b of extendable tube 14. In such an embodiment, it can be appreciated that the safety device 10 does not require an additional means for extending and retracting 32 the extendable tube 14.

Figures 6, 7:
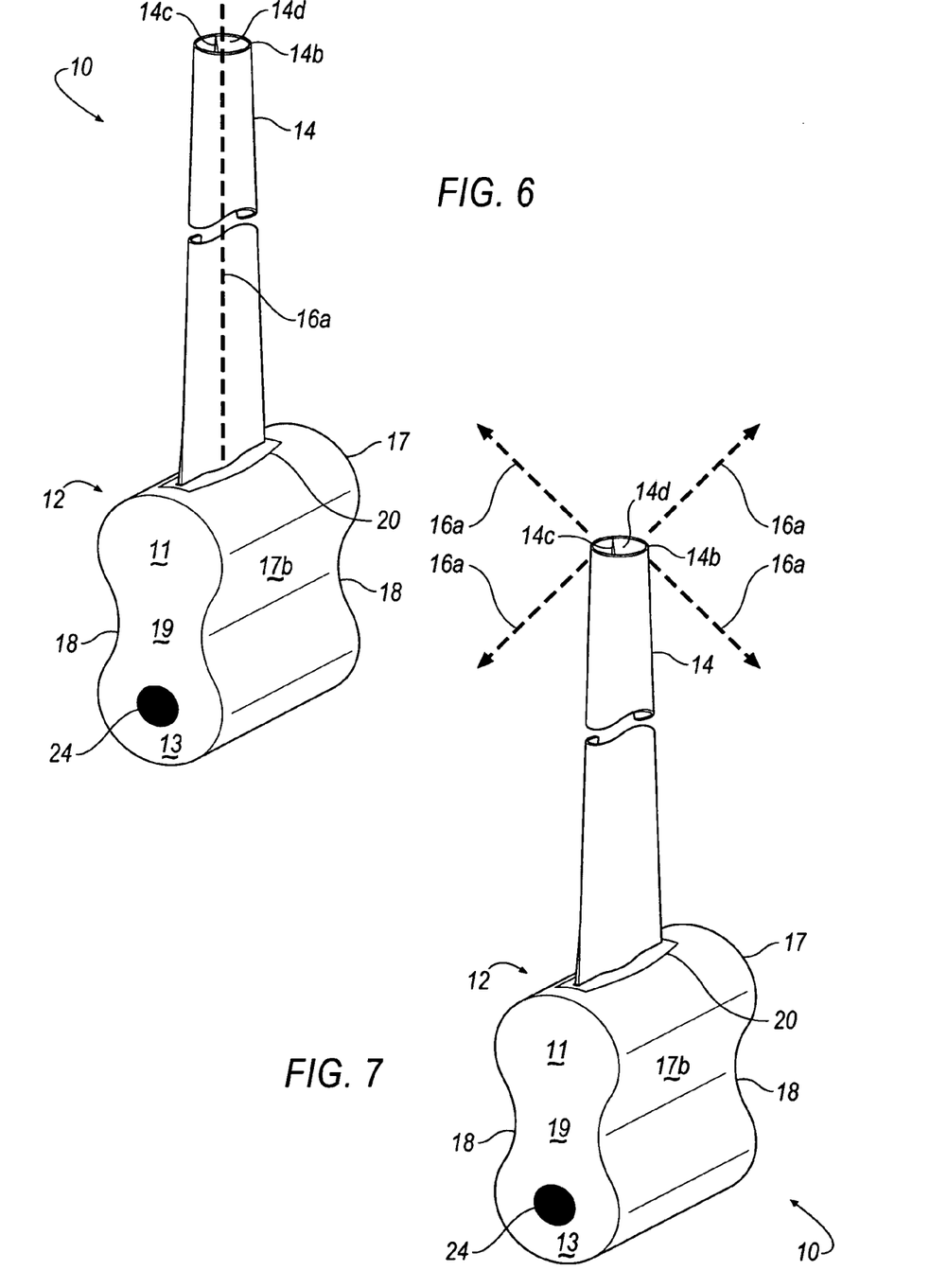
FIG. 6 is a perspective view of the safety device with light being emitted through the partially extended extendable tube according to an embodiment of the invention.
FIG. 7 is a perspective view of the safety device with light being emitted through the partially extended extendable tube according to another embodiment of the invention.
Figure 8:
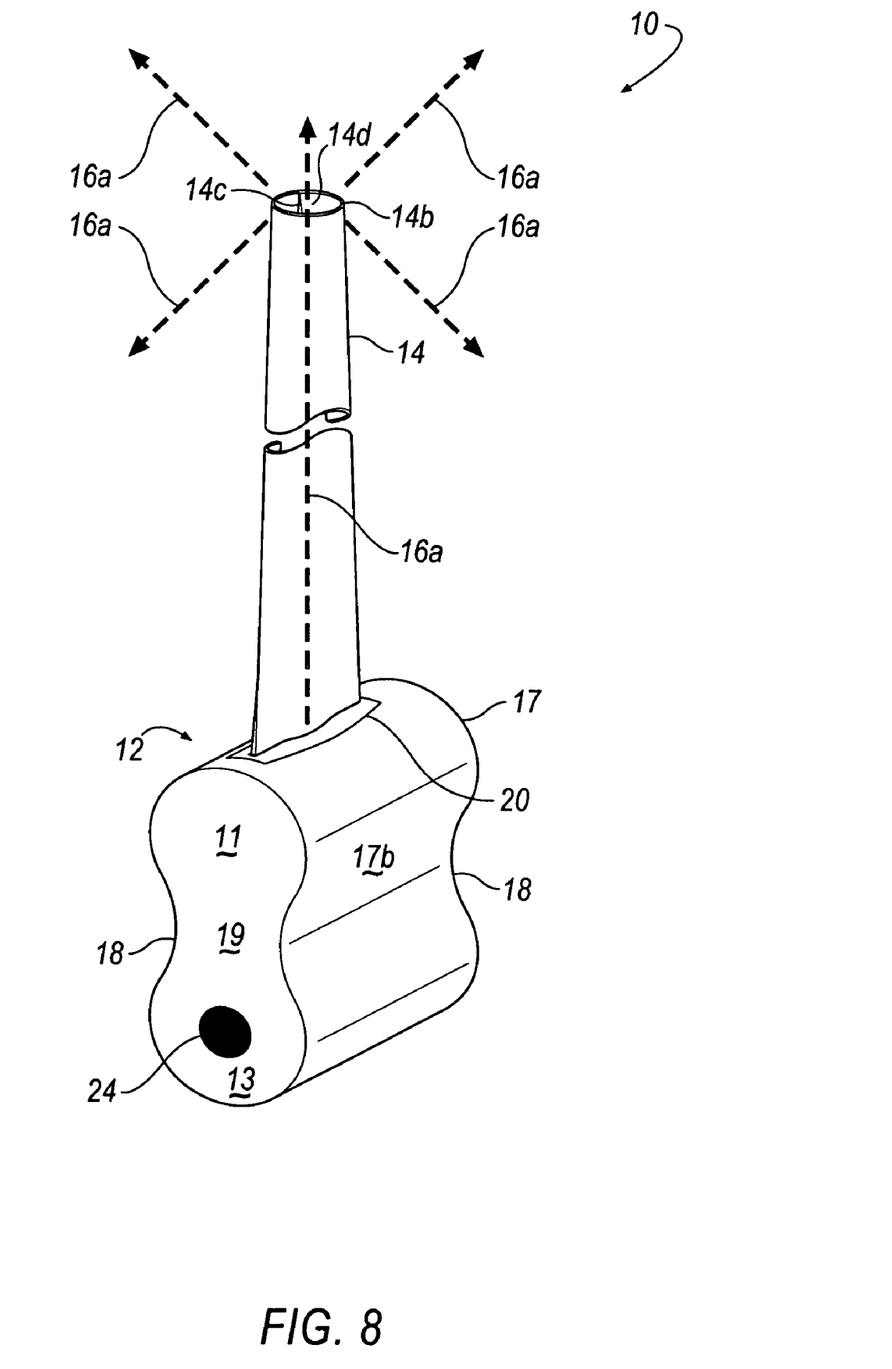
FIG. 8 is a perspective view of the safety device with light being emitted through the partially extended extendable tube according to a further alternate embodiment of the invention.

FIGS. 6-8 illustrate safety device 10 when light source 16 is turned on. As illustrated, light from light source 16 may be reflected up and/or through extendable tube 14 in a variety of different ways. For example, light from light source 16 may be in the form of a constant ray of light, or a pulsating light. Additionally, light source 16 may be any color light if so desired. When extendable tube 14 is a translucent material, the length of extendable tube 14 extending past housing 12 is illuminated by light source 16. FIG. 9 illustrates another embodiment, where light source 16 is attached at free end 14b of extendable tube 14. It can be appreciated that the invention may be practiced with a single light source 16 or multiple light sources 16. For instance, one light source 16 may be secured to housing 12 and a second light source 16 may be secured to free end 14b of extendable tube 14.

Figure 10:
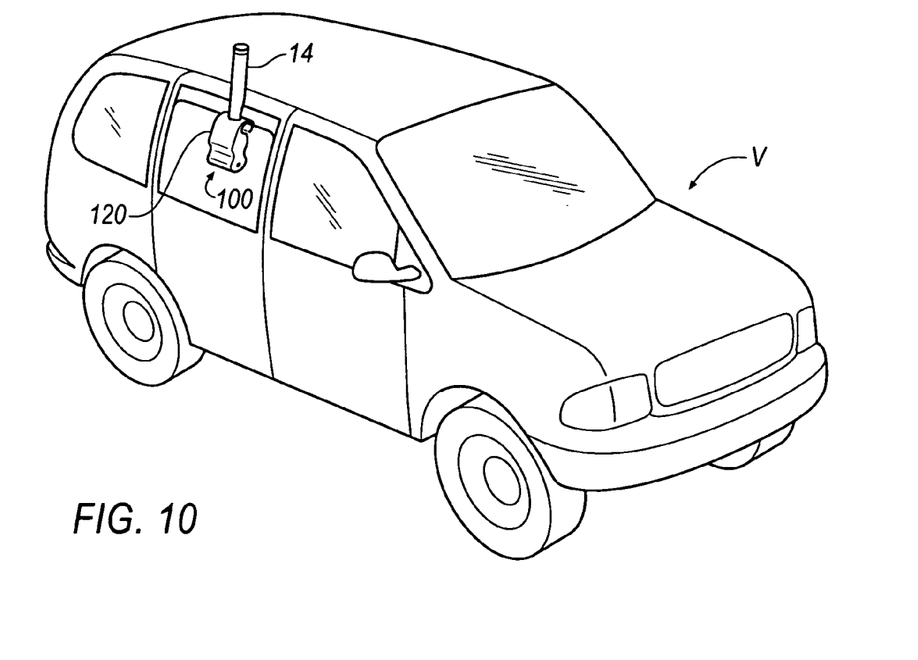
FIG. 10 is a perspective view of the safety device positioned outside a vehicle according to an embodiment of the invention.

FIGS. 9 and 10 illustrated an alternate embodiment of safety device 100. It can be appreciated that safety device 100 is similar to safety device 10, however, housing 120 may further includes an attachment hook 130. Attachment hook 130 may be integrally formed to housing 120, or attachment hook 130 may be rigidly or pivotally secured to housing 120 by, for example, fasteners, adhesives, tapes, glues, or the like. Attachment hook 130 allows housing 120 to be attached to, for instance, a vehicle V window while safety device 100 is being used.

Figure 11:
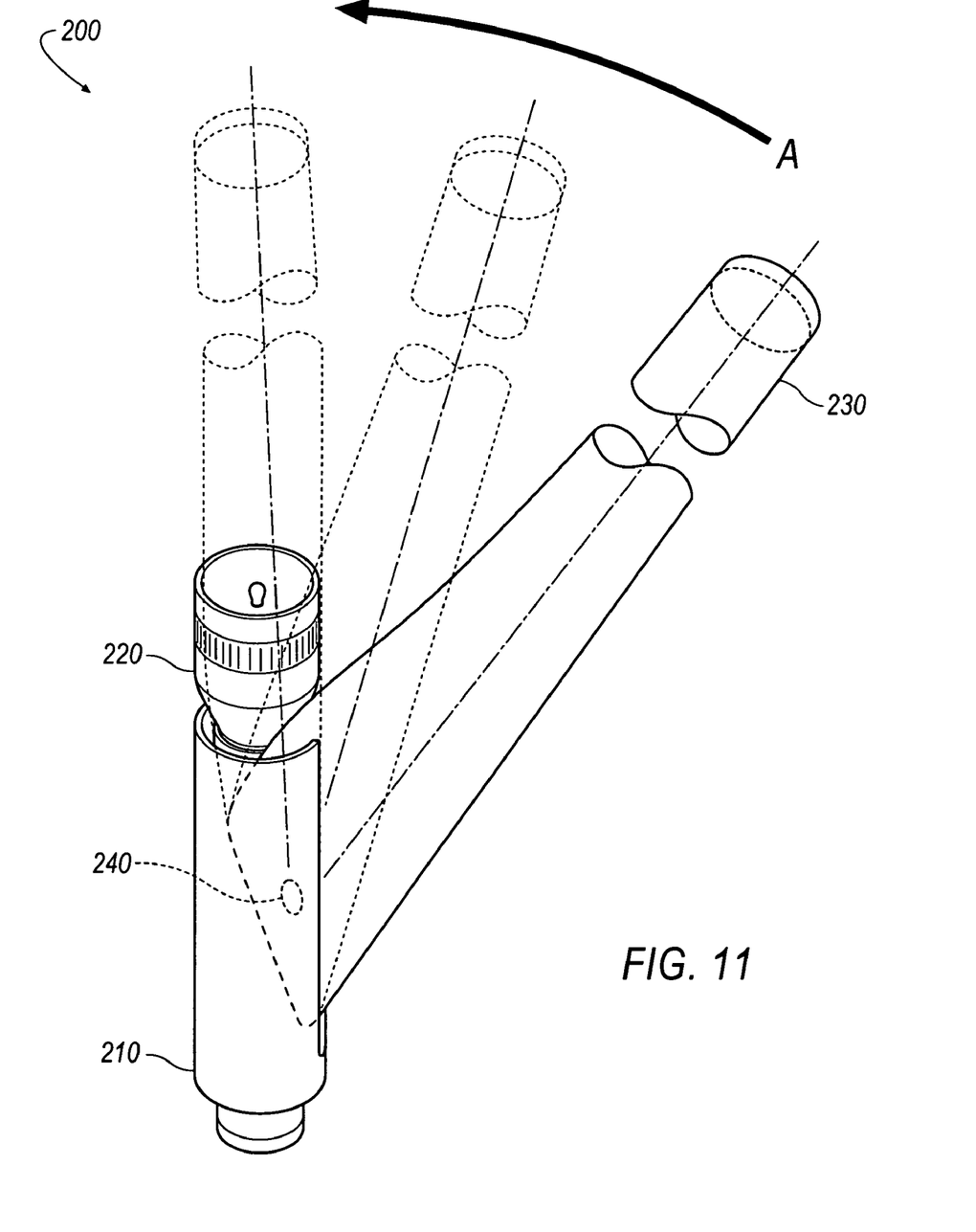
FIG. 11 is a perspective view of the safety device according to another embodiment of the invention.

FIG. 11 illustrates another embodiment of safety device 200. It can be appreciated that safety device 200 is similar to safety device 10, however, housing 210 is shaped such that housing 210 may partially embrace, surround, encase or enclose a conventional flashlight 220. Extendable tube 230 is similar to extendable tube 14, however, extendable tube 230 may be secured or attached to housing 210 such that extendable tube 230 may rotate, or pivot, about an attachment point 240. Arrow A illustrates the general direction in which extendable tube 230 may rotate and extendable tube 14 is illustrated in phantom lines in two positions.

While the safety device 10, 100 and 200 are described above as an emergency light beacon, it can be appreciated that the safety device 10, 100 and 200 can be used for many other purposes in addition to an emergency light beacon. For instance, light source 16 can be supplemented, or replaced, with any number of tools, such as, for example, a grabbing device, a sharp pointer, a razor blade, or the like, to perform a variety of functions. It can be appreciated that this list is representative, and not exhaustive, of the various tools that may be used with this invention. Further, the free end 14b of the extendable tube 14 may include a means for securing various tools, such as, for example, threads, pin and lock, friction fit, adhesives, or the like, so that various tools may be interchangeably used with the extendable tube 14 and housing 12. Light source 16 may be used to illuminate the attached tool, allowing safety device 10 and 100 to be used during the night or in areas with little to no external light.

Moreover, the invention may be used to transport a fluid, such as, for example, a liquid or a gas. For instance, extendable tube 14, 140 and 230 may form an impermeable hollow cross-sectional shape in which fluid may be transported. Alternatively, extendable tube 14, 140 and 230 may be used as a conduit for wires, cables, cords or the like.

The embodiments disclosed herein have been discussed for the purpose of familiarizing the reader with novel aspects of the invention. Although preferred embodiments of the invention have been shown and described, many changes, modifications and substitutions may be made by one having ordinary skill in the art without necessarily departing from the spirit and scope of the invention as described in the following claims.

The invention claimed is:

1. A safety device comprising:
   a tube with an axial split to allow it to be transversely opened and flattened, and longitudinally coiled;
   a housing that accommodates, in size, an opened, flattened tube coiled around an axis; and
   a light source;
   wherein the extendable tube extends from a first position as a coiled flat piece of material to a second position as a thin walled tube.

2. The safety device in claim 1, wherein the predetermined hollow cross-section includes a circular cross-section.

3. The safety device in claim 1, wherein the extendable tube has a translucent wall or an outside reflective surface.

4. The safety device in claim 1, wherein the extendable tube is made of a thermo-set or thermoplastic polymer.

5. The safety device in claim 1, wherein the extendable tube is made of a metal.

6. The safety device in claim 1, wherein the light source illuminates the tube.

7. The safety device in claim 1, wherein the light source projects outwardly.

8. A safety device comprising:
   a tube with an axial split to allow it to be transversely opened and flattened, and longitudinally coiled;
   a housing that accommodates, in size, an opened, flattened tube coiled around an axis; and
   a light source;
   wherein the extendable tube extends from a first position as a coiled flat piece of material to a second position as a thin walled tube and wherein the extendable tube further includes a means along its split for securing the extendable tube in a hollow cross-sectional configuration.

9. The safety device in claim 8, wherein the extendable tube has a translucent wall or an outside reflective surface.

10. The safety device in claim 8, wherein the extendable tube is made of a thermo-set or thermoplastic polymer.

11. The safety device in claim 8, wherein the extendable tube is made of a metal.

12. The safety device in claim 8, wherein the safety device further includes a cover that is snapped onto the housing.

13. A device comprising:
   a tube with an axial split to allow it to be transversely opened and flattened, and longitudinally coiled;
   a housing that accommodates, in size, an opened, flattened tube coiled around an axis; and
   wherein the extendable tube extends from a first position as a coiled flat piece of material to a second position as a thin walled tube, and
   wherein the extendable tube further includes a means at its tip for securing a tool or other implement.

14. The safety device in claim 13, wherein the extendable tube is made of a thermo-set or thermoplastic polymer.

15. The safety device in claim 13, wherein the extendable tube is made of a metal.

16. The device in claim 13, wherein the device further includes means for extending and retracting the extendable tube from a first position to a second position.

17. The device in claim 13, wherein the device further includes a cover for the housing.

18. The safety device in claim 13, which includes a means along its split for securing the extendable tube in a hollow cross-sectional configuration.

* * * * *